(12) United States Patent
Wiener et al.

(10) Patent No.: US 7,720,204 B2
(45) Date of Patent: May 18, 2010

(54) METHOD OF ESTABLISHING A COMMUNICATIONS CALL

(75) Inventors: Victor Wiener, East Brighton (AU); Calvin J. Stein, Turramurra (AU); Carlos Escobar, Glen Waverly (AU)

(73) Assignee: Telstra Corporation Limited, Melbourne, Victoria (AU)

( * ) Notice: Subject to any disclaimer, the term of this patent is extended or adjusted under 35 U.S.C. 154(b) by 0 days.

(21) Appl. No.: 09/990,717

(22) Filed: Nov. 21, 2001

(65) Prior Publication Data
US 2002/0054671 A1    May 9, 2002

Related U.S. Application Data

(63) Continuation of application No. 08/773,652, filed on Dec. 24, 1996, now Pat. No. 6,324,264.

(30) Foreign Application Priority Data

| Mar. 15, 1996 | (AU) | 8693/96 |
| Aug. 1, 1996 | (AU) | 1380/96 |

(51) Int. Cl.
*H04M 1/64* (2006.01)
(52) U.S. Cl. .......... 379/88.22; 379/88.17; 379/265.01
(58) Field of Classification Search ............ 379/67.1, 379/70, 76, 88.03, 88.11, 88.12, 88.13, 88.14, 379/88.17–88.23, 88.25, 93.23, 93.25, 218.01, 379/265.01–266.1
See application file for complete search history.

(56) References Cited

U.S. PATENT DOCUMENTS

| 4,653,085 A | 3/1987 | Chan et al. |
| 4,734,931 A | 3/1988 | Bourg et al. |
| 4,817,129 A | 3/1989 | Riskin |
| 4,868,848 A | 9/1989 | Magnusson et al. |
| 4,979,206 A * | 12/1990 | Padden et al. ............ 379/88.01 |
| 5,179,587 A | 1/1993 | Bock et al. |

(Continued)

FOREIGN PATENT DOCUMENTS

CA    2060738    6/1993

(Continued)

OTHER PUBLICATIONS

U.S. Appl. No. 60/004,603, filed Sep. 29, 1995, Bannister, Govindarajan, Edwards, (Priority document for Int. App. No. PCT/CA96/00574 (WO 97/13352).

(Continued)

*Primary Examiner*—Md S Elahee
(74) *Attorney, Agent, or Firm*—Thomas J. Engellenner; Reza Mollaaghababa; Nutter McClennen & Fish LLP

(57) ABSTRACT

A method system, interface and server for establishing a communications call by selecting a B party (6) using an interactive device (16) connected to a public network (10,12), sending called address data for the B party (6) and calling address data for an A party (4) to a communications platform (18) of the public network (10,12), and establishing a call between the A and B parties (4,6) over the public network (10,12) using the communications platform (18) and the called and calling address data. The called address data can be accessed from the public network, and may reside on a server of a messaging network, such as the Internet.

39 Claims, 9 Drawing Sheets

U.S. PATENT DOCUMENTS

| | | | |
|---|---|---|---|
| 5,204,894 A | | 4/1993 | Darden |
| 5,327,486 A | | 7/1994 | Wolff et al. |
| 5,353,336 A | | 10/1994 | Hou et al. |
| 5,457,738 A | * | 10/1995 | Sylvan ..................... 379/93.23 |
| 5,457,742 A | | 10/1995 | Valillee et al. |
| 5,475,748 A | | 12/1995 | Jones |
| 5,483,586 A | * | 1/1996 | Sussman ................. 379/218.01 |
| 5,524,141 A | * | 6/1996 | Braun et al. ............. 379/93.25 |
| 5,526,353 A | | 6/1996 | Henley et al. |
| 5,530,852 A | | 6/1996 | Meske, Jr. et al. |
| 5,568,540 A | | 10/1996 | Greco et al. |
| 5,572,643 A | | 11/1996 | Judson |
| 5,610,910 A | * | 3/1997 | Focsaneanu et al. ........ 370/351 |
| 5,740,231 A | | 4/1998 | Cohn et al. |
| 5,742,670 A | * | 4/1998 | Bennett ..................... 379/142 |
| 5,768,578 A | | 6/1998 | Kirk et al. |
| 5,793,762 A | * | 8/1998 | Penners et al. ............. 370/389 |
| 5,805,587 A | | 9/1998 | Norris et al. |
| 5,835,583 A | | 11/1998 | Hetz et al. |
| 5,838,682 A | * | 11/1998 | Dekelbaum et al. ........ 370/401 |
| 5,884,032 A | * | 3/1999 | Bateman et al. .......... 395/20.34 |
| 5,913,028 A | | 6/1999 | Wang et al. |
| 5,915,001 A | * | 6/1999 | Uppaluru ................. 379/88.22 |
| 5,956,485 A | * | 9/1999 | Perlman ................ 395/200.34 |
| 5,991,394 A | * | 11/1999 | Dezonno et al. ............ 379/265 |
| 6,064,723 A | * | 5/2000 | Cohn et al. ............... 379/88.14 |
| 6,173,045 B1 | * | 1/2001 | Smith ..................... 379/93.23 |
| 6,282,284 B1 | | 8/2001 | Dezonno et al. ............ 379/265 |
| 6,430,282 B1 | * | 8/2002 | Bannister et al. ....... 379/211.02 |

FOREIGN PATENT DOCUMENTS

| | | |
|---|---|---|
| DE | 3629468 A1 | 3/1988 |
| DE | 3900364 | 2/1989 |
| EP | 0394811 A2 | 10/1990 |
| EP | 526729 A2 | 2/1993 |
| JP | 01-058159 | 6/1989 |
| JP | 4-215356 | 1/1992 |
| JP | 6-90309 | 1/1994 |
| JP | 7-231355 | 1/1995 |
| JP | 8-139798 | 1/1996 |
| WO | 96/05681 | 2/1996 |
| WO | 96/12370 | 4/1996 |
| WO | 96/20553 | 7/1996 |
| WO | 97/13352 | 4/1997 |

OTHER PUBLICATIONS

U.S. Appl. No. 08/652,659, filed May 28, 1996, Bannister, Govindarajan, Edwards, (Priority document for Int. App. No. PCT/CA96/00574 (WO 97/13352).

* cited by examiner

METHOD OF ESTABLISHING A COMMUNICATIONS CALL

REFERENCE TO RELATED APPLICATIONS

This application is a continuation of U.S. patent application Ser. No. 08/773,652, filed Dec. 24, 1996 now U.S. Pat. No. 6,324,264.

FIELD OF THE INVENTION

The present invention relates to a method of establishing a communications call and a system for use in establishing a call.

BACKGROUND OF THE INVENTION

Currently to establish a public telecommunications call requires an originating party to know the telephone number of the destination and to take steps to either manually dial the number or to cause the number to be accessed from a database maintained by the originating party and dialed. If the originating party does not know the number of the destination then service personnel of a carrier can be contacted to obtain the number and if desired connect the originating party and destination party, hereinafter referred to as the A and B party, respectively.

The B party's number can also be determined by consulting a public directory which may be in print or electronic form. A call with the B party can then be established by dialing the number obtained.

As information concerning the B party's number is known by a telecommunications carrier a method and system is desired to enable that information to be used automatically, on request, to establish a call between the A party and the B party without the caller having to dial the number.

SUMMARY OF THE INVENTION

In accordance with the present invention there is provided a method of establishing a communications call, including:
  selecting a B party using an interactive device connected to a public network;
  sending called address data for said B party and calling address data for an A party to communications means of said public network; and
  establishing a call between said A and B parties over said public network using said communications means and said called and calling address data.

The present invention also provides a method of originating a communications call, including:
  selecting a B party using an interactive device connected to a public network; and
  sending, in response to selection of said B party, selected party data corresponding to said B party to said public network;
  whereby said public network provides said called address data for said B party to communications means for establishing a call between an A party and said B party.

The present invention further provides an interface of an interactive device for originating a communications call, including:
  means for causing display of at least one B party;
  means for enabling a B party to be selected on said display; and
  a link which on being activated sends selected party data corresponding to said B party to a public network, whereby said public network instructs communications means of said public network to establish a call with said B party.

The present invention also provides an interface stored on an interactive device connected to a public network, including:
  code for generating a display on said device of B party data;
  code allowing selection of a B party from said B party data;
  code for transmitting to said public network selected party data corresponding to the selected B party; and
  code for transmitting to said public network A party data, whereby said public network establishes a call between an A party and a B party corresponding to said A party data and said selected party data.

The present invention also provides a system for use in establishing a communications call, including:
  called address data for parties connected to at least one public network;
  an access module for transmitting said called address data for displaying an interactive device, and for receiving selected party data from said interactive device; and
  network means for receiving said selected party data, including called address data for the selected party, and calling address data corresponding to an A party and generating, in response thereto, network control signals to cause said network to establish a call between said A party and said B party over said network.

The present invention further provides a system for use in establishing a communications call, including:
  a directory database including called address data for parties connected to at least one public network;
  an access module for receiving on said network selected party data corresponding to a B party and accessing called address data on the basis of said selected party data from said directory database; and
  network means for receiving said called address data and calling address data corresponding to an A party and generating, in response thereto, network control signals to cause said network to establish a call been said A party and said B party over said network.

The present invention also provides a directory server for use in establishing a communications call, including:
  a directory database module for accessing directory data, including communications address data, of parties connected to at least one public network;
  a call connection module for transmission to an interactive device of a user and for accessing for said interactive device directory data using said directory database module;
  a call completion module for receiving selected party data for a B party of said call from said interactive device and transmitting a connect message to communications means of said public network for establishing said call, said connect message including communications address data for said B party obtained using said directory database module.

The present invention further provides a server for use in establishing a communications call, including:
  a call connection module for transmission to an interactive device of a user and for transmitting a connection message from said interactive device;
  a call completion module for receiving said connection message and forwarding a connect message to communications means of a public network for establishing a call between A and B parties;

wherein said connection message includes data identifying at least said B party and said connect message includes communications address data for said A and B parties.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENTS

Figure 1:
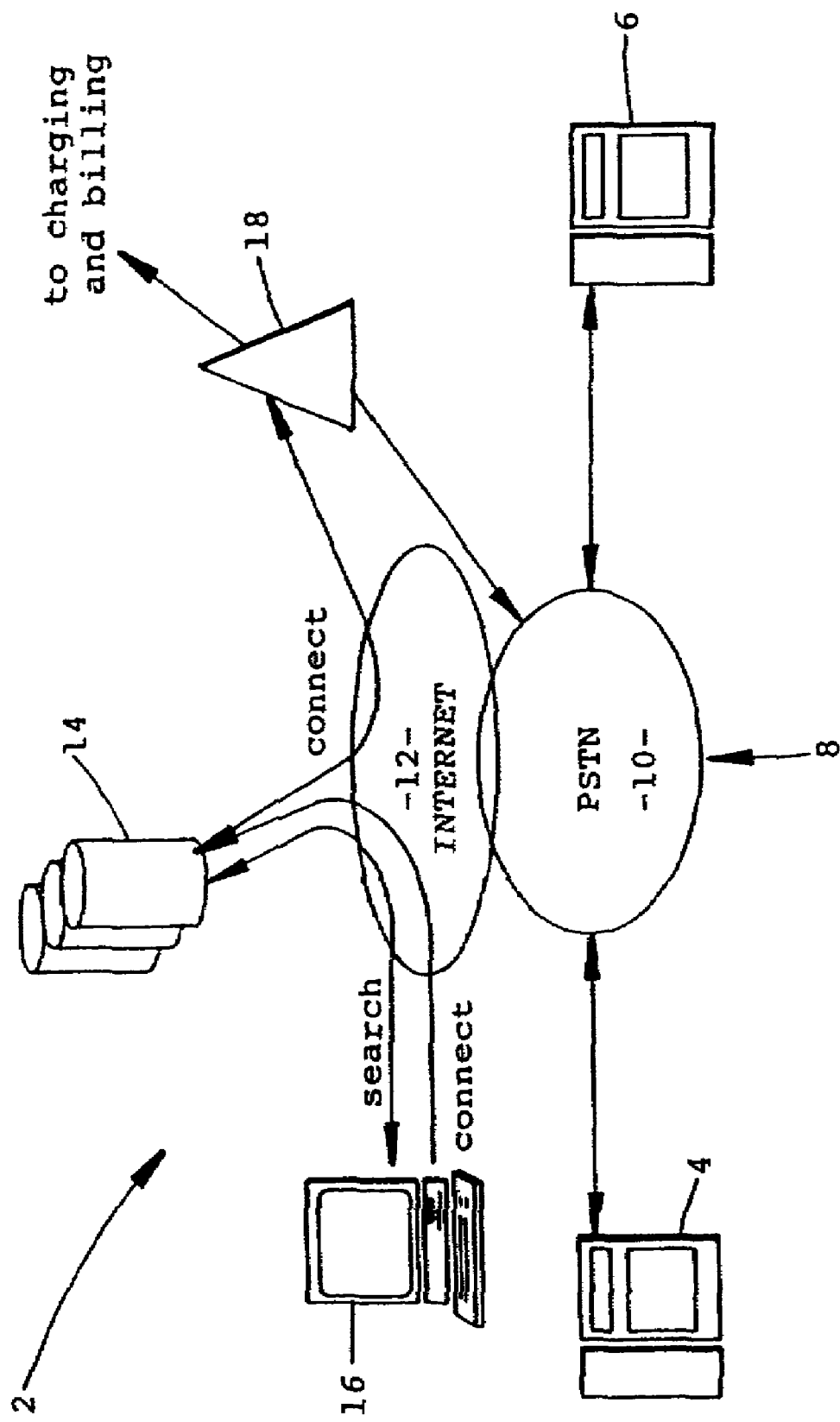
FIG. 1 is a schematic diagram of a first preferred embodiment of a system for use in establishing a telecommunications call.

A system 2 for establishing a telecommunications call between two parties 4 and 6, as shown in FIG. 1, uses a network 8 which includes a telecommunications network 10 and a messaging network 12. The telecommunications network 10 may be any Public Switched Telephone Network (PSTN) such as that maintained by the applicant. The messaging network 12 may be a TCP/IP network, such as the Internet, which is supported by the PSTN 10 and used to connect interactive devices, such as personal computers. The system 2 includes a directory service 14 which is accessible via the messaging network 12 and provides directory information, such as the telecommunications address or number for a party 4 or 6 which can be connected by the telecommunications network 10. A customer or user of the directory service 14 can use their interactive device 16 to access the directory information. The directory service 14 may include a search module, or alternatively provides a search applet to the interactive device 16, which allows a device 16 connected to the service 14 to search through the directory information using keywords or search strings for selected parts of the information. For example, the device 16 may be used to search for the name of a B party the user may wish to establish a connection with. Once details concerning the desired B party have been displayed on the screen of the interactive device 16, the user can select that party to indicate it wishes a connection to be established so as to establish a call with that party. The selection can be made using the device 16 by clicking on a icon or hypertext relating to the B party on the display, using a voice recognition command, or using a keyboard of the device 16.

Once the B party has been selected by the interactive device 16, a connection message is sent via the messaging network 12 to the directory service 14. The connection message, which includes identifying information concerning the B party, is used to access a telecommunications address for the B party and a telecommunications address also for the A party for a telecommunications call. The telecommunications terminal for the A party may be a terminal of the customer or user or a terminal of another party which the user has designated as being the A party. Alternatively a connection server can be used to receive the connection message and obtain, if necessary, address data from the directory service 14.

The directory service 14 then forwards a connect message, which includes telecommunications addresses, via the messaging network 12 to an Intelligent Network (IN) control platform 18 of the system 2. The IN platform 18 uses the data in the connect message to provide control signals to a switch of the telecommunications network 10 which causes the network 10 to dial the A party 4 and the B party 6 and establish a call between the two parties 4 and 6. The IN platform 18 also uses the data to forward charging and billing information to a charging and billing module, which may be unique to the system 2 or simply form part of the charging and billing modules used for the telecommunications network 10.

The directory service 14 can be provided by an Internet World Wide Web (WWW) server which maintains a directory web site and includes or allows access to machines maintaining a directory database 20. The server would include a number of web pages 22 written in HTML and a directory application 24 which in response to selections made on the pages 22 is able to access and provide for pages 22 directory information from the directory database 20.

The directory database 20 accessed by the directory application 24 may comprise a number of directory databases 26 to 30 in a number of different locations and for different regions or countries which are accessed by the directory application 24 using a communications network 32, such as an X.25 network. The directory application 24 may go directly via the communications network 32 or via an Internet gateway 34 to the Communications network 32. The directory information provided for the pages 22 of the WWW site are accessible by the interactive device 16 of the customer using a web browser, such as Microsoft Internet Explorer or Netscape Navigator. The directory application 24 of the service 14 also includes a search module which allows the user to search the directory information on the basis of keywords or search strings to locate information for a desired party. The directory information would normally include the name of the party, a telephone address or number, and residential or business addresses.

The directory information access and search modules of the service 14 described above are currently provided on a WWW server maintained by the applicant and accessible at http://www.whitepages.com.au/ for White Pages and at http://www.yellowpages.com.au/ for Yellow Pages. The directory service 14 enhances the existing server by including call completion hypertext links with a call completion page 38 for the web pages 22 and adding call completion script 40 to the directory application 24, as shown in FIG. 4.

Figure 4:
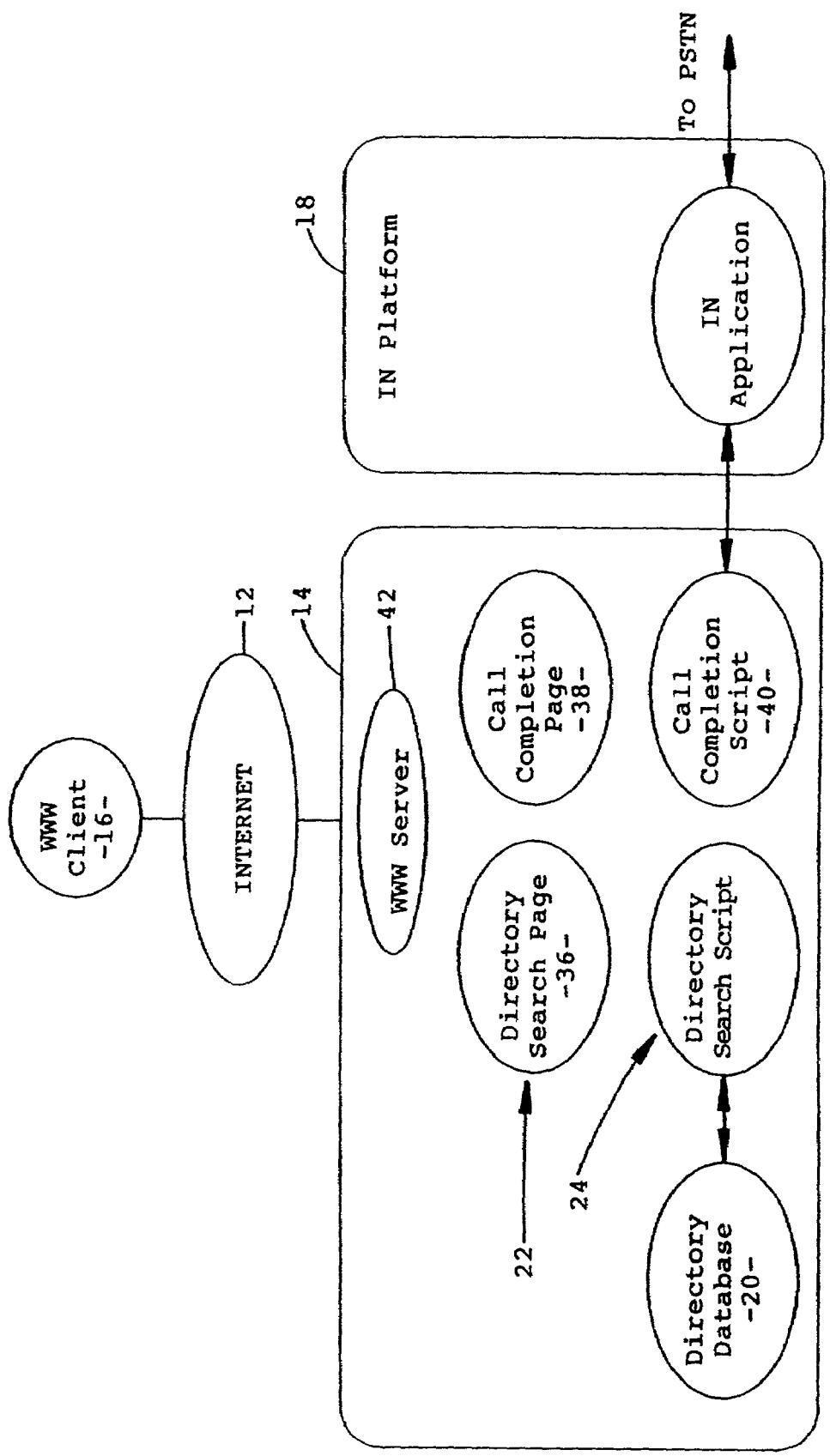
FIG. 4 is a more detailed block diagram of a directory service of the system of FIG. 1.

The directory interface 14, as shown in FIG. 4, includes the WWW server 42 which maintains and executes the web pages 22 and the directory application 24 which includes the directory search script and the call completion script 40. The server provides interfaces to the customer 16 as a WWW client, and implements the HTTP protocol to serve requests from the client 16. The directory search page 36 includes directory search hypertext links and the server 42 sends this page to the client 16 requesting the user to enter search details, for example, name or any part of it, address details, city or suburb. The directory search scripts 24 are attached to the links of the directory search page 36 and are activated when a link is selected so as to send a search request to the directory database 20 to select entries that match the parameters of the search query. The directory database 20 includes an interface which is able to accept search queries from the directory application and may use any standard database query language or interface to obtain directory information from the database 20. The call completion page 38 receives and displays search results obtained by the directory application 24 and includes the call completion hypertext links.

Figure 5:
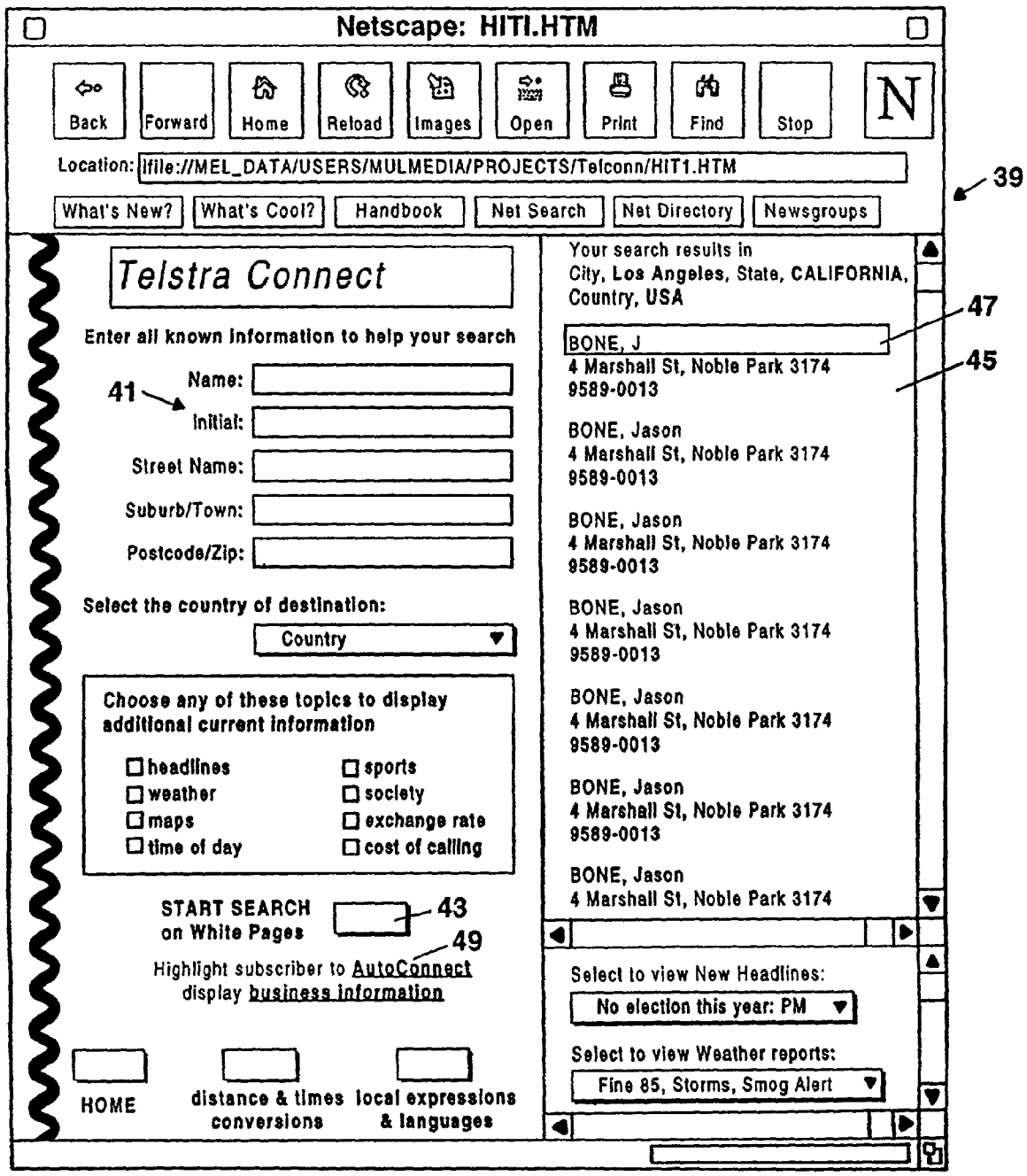
FIG. 5 is a diagram of a first user interface.

A screen display 39, as shown in FIG. 5, can be produced from the directory search and call completion pages 36 and 38 using a frames facility provided by the web browser. The display 39 provides boxes 41 for the entry of search information and a button link 43 to commence a search based on the entered search information. The results of the search are displayed in a frame 45 which allows a selected party 47 to be highlighted. A connection with the highlighted party 47 can then be requested by clicking on the hypertext "Auto Connect" 49 which invokes the call completion script 40.

If desired, the database searching functions can be omitted or not activated by providing a call completion page 38 which does not have to include search results and simply includes call completion hypertext links which allow party select data to be generated or call address data to be entered. The call completion scripts or codes 40 are attached to the call completion hypertext links of the call completion page 38 and are executed when the WWW client 16 selects one of the links. Further web pages may then be forwarded to the client 16 for user interaction. These are form bred pages that the user needs to complete to provide identification and charging information, such as a Telecard number (i.e. calling card number) and PIN, and the A party's telephone number. Alternatively prior arrangements may be made to authorise the A and/or B parties and the cost of the call directed to one or both of the parties. The B party number used will be that selected from the search results displayed on the call completion page 38 or another number which the user may enter or select. All of the information, including the A and B party numbers are collected by the call completion scripts and provided to an interface to the IN platform 18 of the directory application 24. The interface of the directory application 24 places the information in an appropriate message format as a connect message for transmission via the Internet 12 to an Internet gateway 50 of the IN platform 18.

Figure 2:
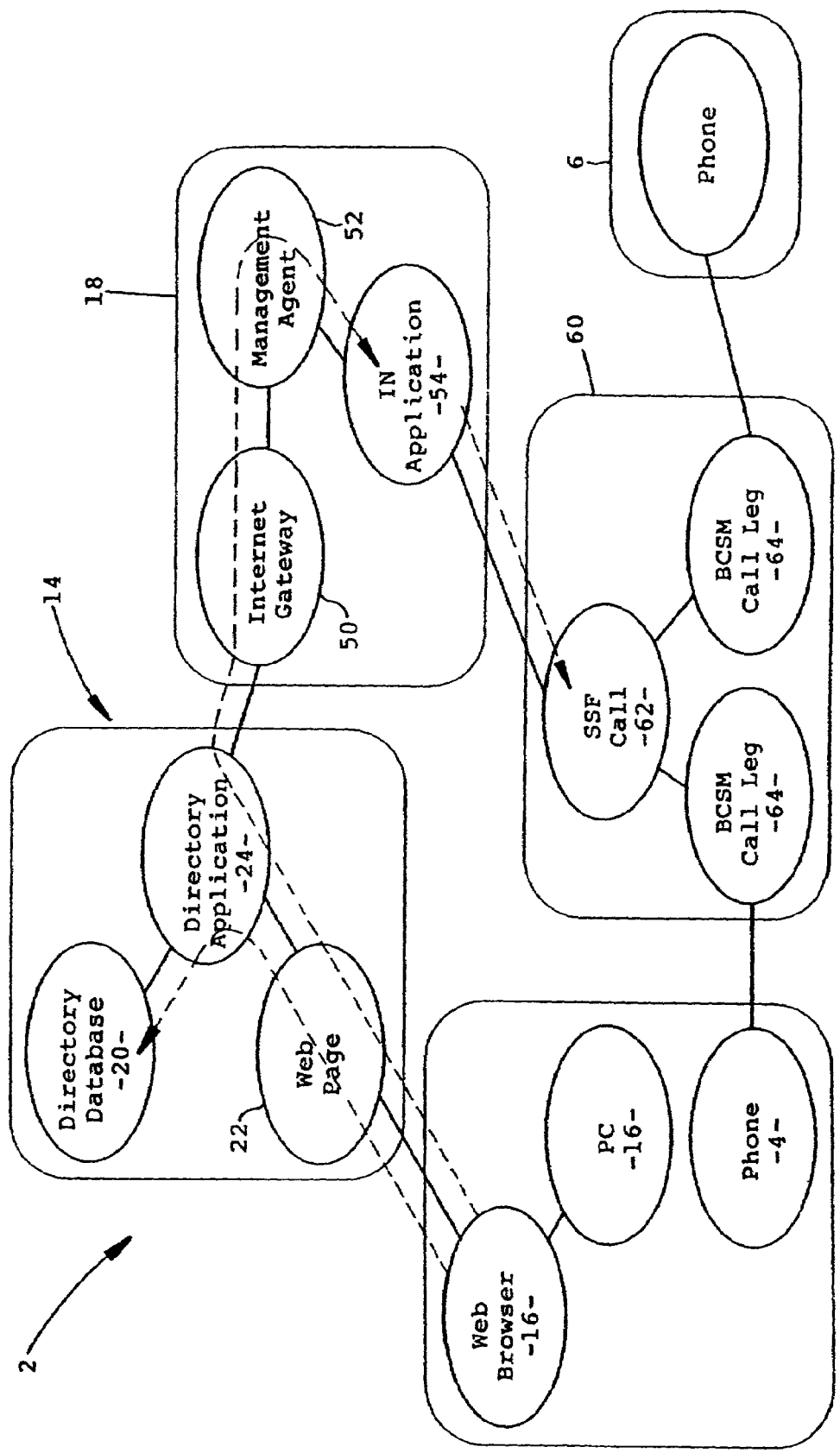
FIG. 2 is a block diagram of the system of FIG. 1.
Figure 3:
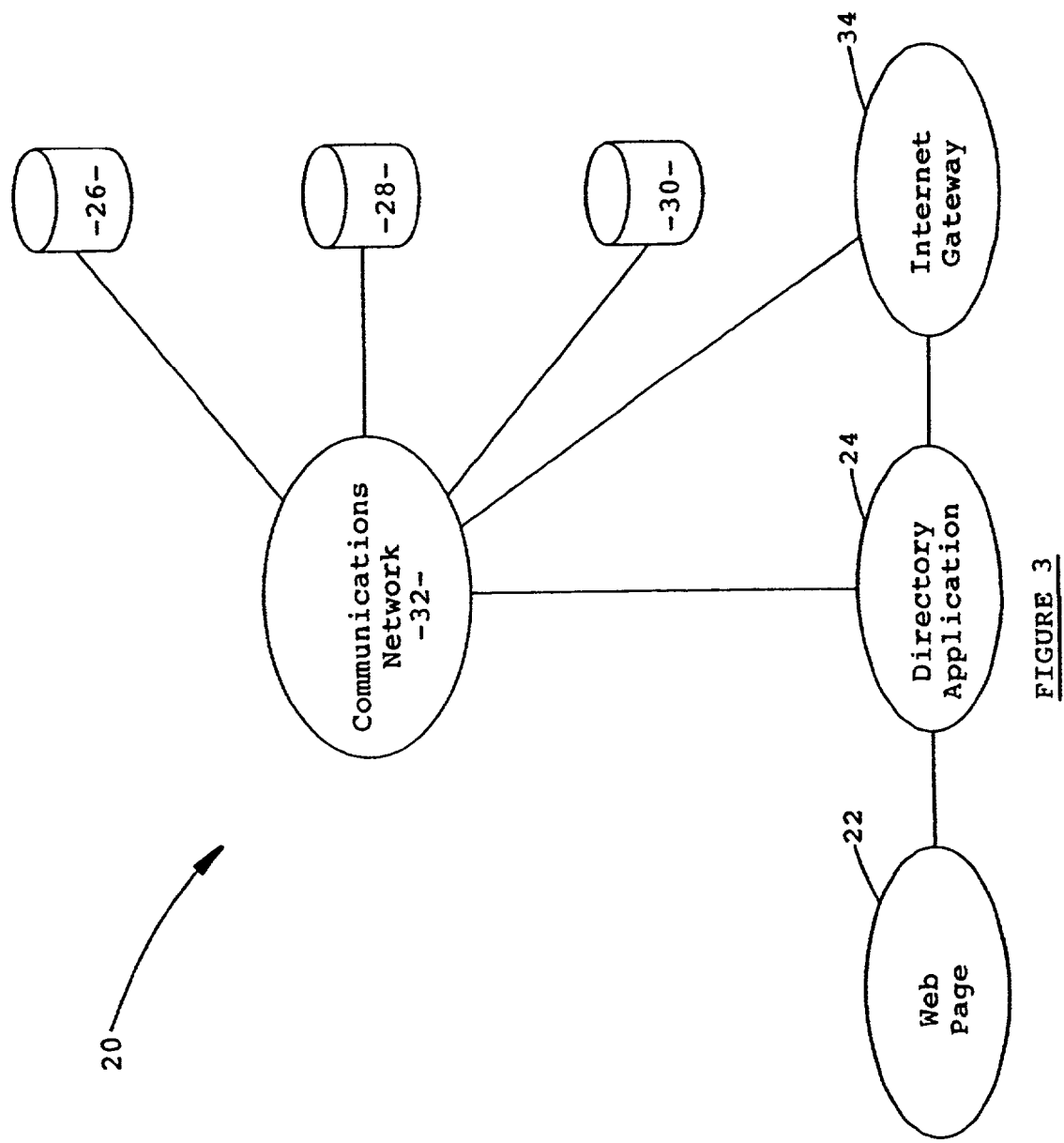
FIG. 3 is a diagram of a distributed directory database of the system of FIG. 1.

The IN platform 18, as shown in FIG. 2, receives the connect message via the Internet gateway 50 and passes it to a management agent 52 which extracts the required connection information for an IN application 54 of the platform 18. The IN application 54 generates and sends control signs to an IN switch 60 of the PSTN 10 to establish the call between the A party and the B party 4 and 6. The control signals include data representative of the telephone addresses or numbers for the parties 4 and 6.

The IN platform 18 and the IN switch 60 include standard network components which are defined by the International Telecommunications Union (ITU) Recommendation Q.1214, entitled "Distributed Functional Plane for Intelligent Network CS-1", which is incorporated herein by reference. A standard protocol is used for information exchange between the components, as described in ITU Recommendation Q.1218, entitled "Interface Recommendation for Intelligent Network CS-1", which is also incorporated herein by reference.

The IN platform 18 may comprise the Scants intelligent network platform owned by the applicant which is currently used to establish connections between computers over the PSTN 10. The Scants IN platform is described in the specification of U.S. Pat. No. 5,519,770. The Scants IN platform 18 on receiving a connection request instructs an IN switch 60 to call the A party 4 first, inform that party of the call establishment, and then call the B party 6 to connect it to the A party. The Scants platform 18 is run on a server which needs to receive the domain name and the IP address of the server running the web pages 22 and directory application 24 of the directory service 14, as it is this directory server which is requesting the connection be made. The Scants server is able to attend to call charging and billing once it receives the account details, such as the Telecard and PIN number, of the WWW client 16 from the directory service 14.

Figure 6:
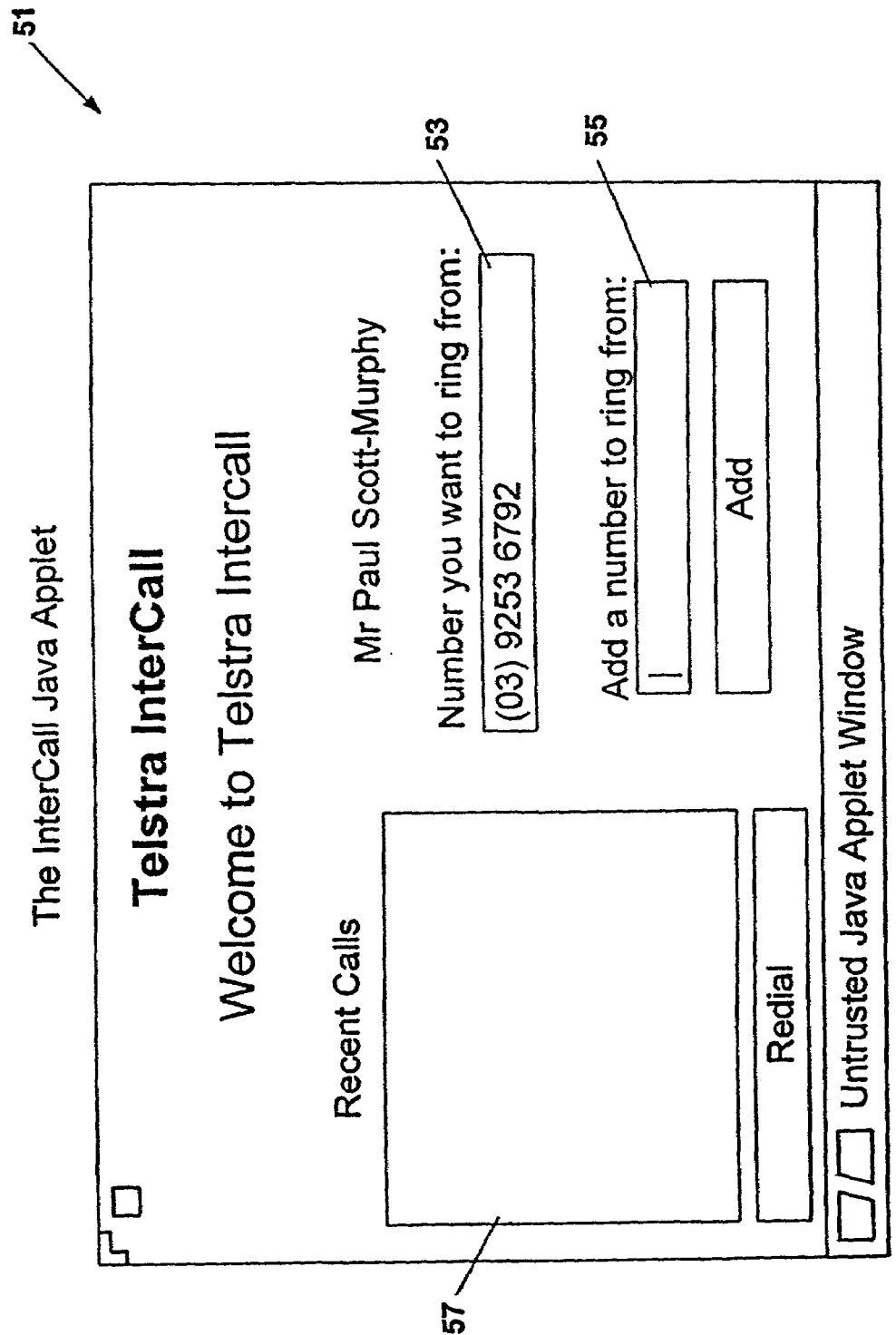
FIG. 6 is a diagram of a second user interface.

The directory application 24 can be implemented by a server, hereinafter referred to as the InterCall Server, written in the Java language, which would also be able to provide the pages 22 and all other features of the directory service 14 around the directory database 20. The InterCall Server is set up to execute on a UNIX host machine 42 connected to a TCP/IP network 12. The Inter Server controls the directory server system 14 and creates a pair of server sockets, one for serving http requests and the other for serving applet requests. Users with a Java capable browser, such as Netscape Navigator 2.0 for Windows 95, receive a Java applet at their interactive device 16 after logging onto the directory service 14. The applet includes two parameters which specify a user name and key. The user name is the same as that entered by the user to log into the service 14, while the key is a random string generated by the InterCall Server, and matched to the user name so that only one applet may log in for the user. The applet, running on the interactive device 16, can provide an interface 51, as shown in FIG. 6, to the InterCall Server for the user. The interface 51 includes a party number selector 53, a field 55 to add a panty number, and a list 57 of recently dialled calls, from which a user may redial a number. The applet communicates with the InterCall Server through an applet_stub and an applet_reader object, which implement a protocol to send human readable messages in a client/server manner between the user's interactive device 16 and the directory service 14. The messages consist of a single line of ASCII characters, and a terminating new line character, and are set out in Table 1 below:

TABLE 1

| Direction | Message | Meaning |
| --- | --- | --- |
| Applet to Server | USER username | This message is the first sent by the applet when it logs into the server. The username parameter is a base64 encoded string that is the usernname associated with the applet. |
| Applet to Server | KEY key | This is the second message sent by the applet when it logs into the server. The key parameter is the same as the key that was passed as a parameter with the applet. The key is a unique random string that ensures an applet can login only once. After sending the KEY message, the applet waits for a response that will be either of the following two messages. |

TABLE 1-continued

| Direction | Message | Meaning |
|---|---|---|
| Server to Applet | BYE | The BYE message is sent in response to a failed login attempt this may be sent because the authorisation of the applet failed, or because of some system error. |
| Server to Applet | OK user anum1 anum2 | The OK message is sent in response to a successful applet login attempt. The user parameter is a base64 encoding of the full name of the user that has logged in. The anumn parameters are base64 encodings of the valid A party numbers for the user, the first being the default number. |
| Server to Applet | PING | A PING message is used by the server to determine if the socket to an applet is writable. It is ignored by the applet. |
| Server to Applet | CALL bnum | The CALL message is sent to the applet when the server has determined that the user of the applet has requested a call. The bnum parameter is a base64 encoding of the B party number of the call request. The applet should response with an OK or CANCEL message. |
| Server to Applet | STATUS code | The STATUS message is sent to an applet to inform it of the current status of the call request. The code parameter is a 3 digit response code that currently uses the same syntax as the response codes generated by the Scants platform. |
| Server to Applet | INCOMING user | The INCOMING message is scat to an applet to inform it that another user logged in to the InterCall system has requested a call to the default A party number of this applet. This is a form of calling party identification. The user parameter is the name of the user that requested the call. |
| Server to Applet | BYE | The BYE message is sent to inform the applet that it should shut down. |
| Applet to Server | OK anum | The OK message is sent in response to a CALL message sent by the server. It indicates to the server that the call should be attempted. The anum parameter is a base64 encoding of the A party number for the call - typically currently selected A party number of the applet. |
| Applet to Server | CANCEL | The CANCEL message is sent in response to a CALL message sent by the server. It indicates to the server that the call should not be attempted. |
| Applet to Server | CALL bnum | The CALL message is sent by the applet to the server to request initiation of a call. The server responds with a CALL message. The bnum parameter is a base64 encoding of the B party number for the call. |

Instead of using a Telecard number and PIN number, the InterCall Server obtains a username, together with a password if necessary, to identify a user for billing purposes. The username is provided to the IN platform 18 instead of the Telecard number.

The Scants IN platform 18, as discussed above, provides a TCP/IP interface for a call back system. The InterCall Server can connect to the Scants platform 18 to send call requests. The InterCall Server achieves this by simply passing or translating the messages received from the applet into a series of ASCII characters, separated by a TELNET newline character for the Scants platform 18. The format of the ASCII characters need to comply with the format set out below for Scants messages. The call completion script 40 would, in response to a call request, forward the same messages as the InterCall Server to the Scants IN platform 18. The Scants platform 18 only requires registration of the IP address of the machine 42 from which the InterCall Server will attempt to connect to the platform 18, and then the messages can be sent and received.

The format of communication messages between the directory service 14, i.e. the InterCall Server, and the Scants platform 18 are set out below.

Format of Request (from Directory Server to Scants server):

```
char mti;          // message type identifier, 'R' for request
char version;      // '0' initially
char id[8];        // message ID, numeric base 10 id, all digits filled
                   // should uniquely identify request
                   // (used to match response)
```

-continued

```
char card[15];     // full telecard number, left justified, space filled
char pin[4];       // telecard pin, left justified, space filled
char anum[24];     // a-party number, left justified, space filled
                   // E.164 format
char bnum≠12];     // b-party number (Australian number) - area code plus
                   // subscriber number, left justified, space filled
char newline[2];   // request separator - using default telnet newline
                   // which is 0x0d followed by 0x0a.
```

Format of Response (from Scants Server to Directory Server):

```
char mti;          // message type identifier, 'S' for status
char version;      // '0' initially
char id[8];        // message id, numeric base 10 id, all digits filled
                   // matches id given in request
char rcode[3];     //3 digit response/status code
char eventTime     // MMDDhhmmss (month, day, hour, minute, second)
[10];              // either answer time or clear time
char newline[2];   // response scparator - using default telnet newline
                   // which is 0x0d followed by 0x0a.
```

Response from the Scants server to the Directory server occur when either:
  the card/pin validation is incorrect
  the A or B parties cannot be reached
  the A and B parties are connected
  the call is complete after the parties have been connected

EXAMPLE

After the A and B parties are connected response (rcode 600) is returned. After the call ends an additional response (rcode 601) is returned.

Response Codes and Categories
Response Codes Specific to Call Back Requests

| | |
|---|---|
| 600 | call answered and in progress (A and B party connected) |
| 601 | call finished |
| 602 | ssh can't cope with request |
| 603 | card got lost or corrupted |
| 604 | pin go: lost or corrupted |
| 605 | lost, or not a valid number |
| 606 | lost, or not a valid number |
| 607 | can't ring A - busy |
| 608 | can't ring B - busy |
| 609 | can't ring A - network failed |
| 610 | can't ring B - network failed |
| 611 | can't ring A - no answer |
| 612 | can't ring H - no answer |
| 613 | a system/software failure |

Response Codes to do with Card Validation and Authorisation

| | |
|---|---|
| 100 | full approval |
| 101 | time limited approval |
| 102 | cost limited approval |
| 108 | no such card |
| 110 | retry request |
| 118 | card expired |
| 119 | wrong pin |
| 121 | too many tries |
| 125 | card restricted |
| 131 | wrong issuer (unrecognised card number) |

Response Codes Indicating General Failure Within Scants

| | |
|---|---|
| 900 | local comms failure |
| 901 | remote comms failure |
| 902 | remote comms failure (no alternative) |
| 903 | incomplete request (missing mandatory data) |
| 904 | tman error |
| 905 | bad request |
| 906 | route not found |

The IN switch 60 supports the International Telecommunications Union (ITU) Intelligent Network (IN) standard capabilities and protocols defined for a Service Switch Function (SSF). The switch 60 includes a SSF call module 62 to receive and act on the connection control signals sent from the IN control platform 18, which acts as the Service Control Function (SCF). The module 62 then invokes Basic Call State Model (BCSM) call leg procedures 64 contact and connect the A and B parties 4 and 6 over the PSTN 10.

The IN switch 60 can be substituted by a Private Branch Exchange (PBX) or a virtual PBX (also known as CENTREX). The connection control protocol would follow a standard Computer-Telephony Interface as defined by ITU in "Telecommunications Applications for Switches and Computers" (TASC), ITU-T Recommendations Q.1301, Q.1302 and Q.1303, or the equivalent ANSI Standard entitled "Switch-Computer Applications Interface" (SCAI).

Figure 7:
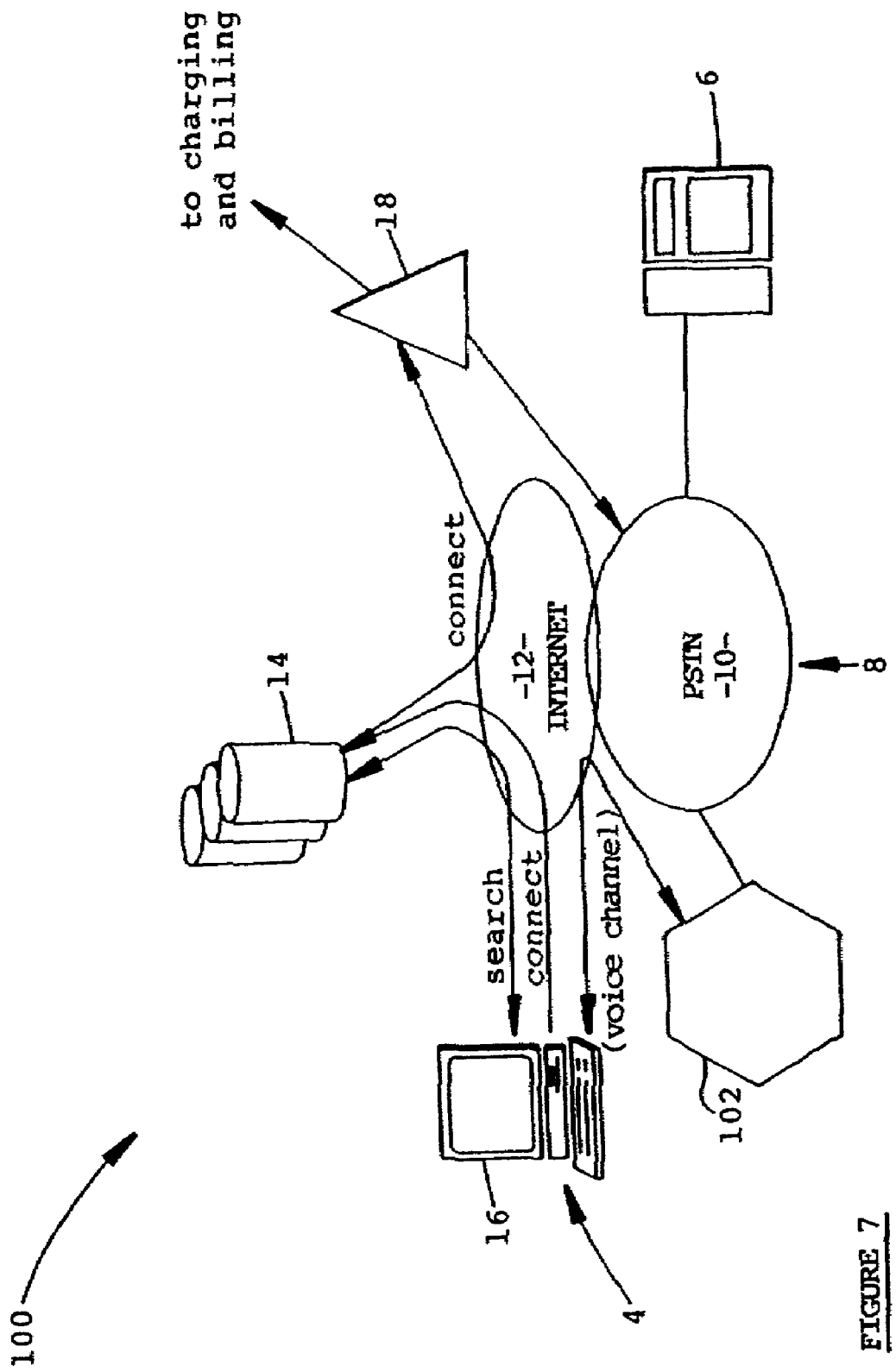
FIG. 7 is a schematic diagram of a second preferred embodiment of a system for use in establishing a telecommunications call.
Figure 8:
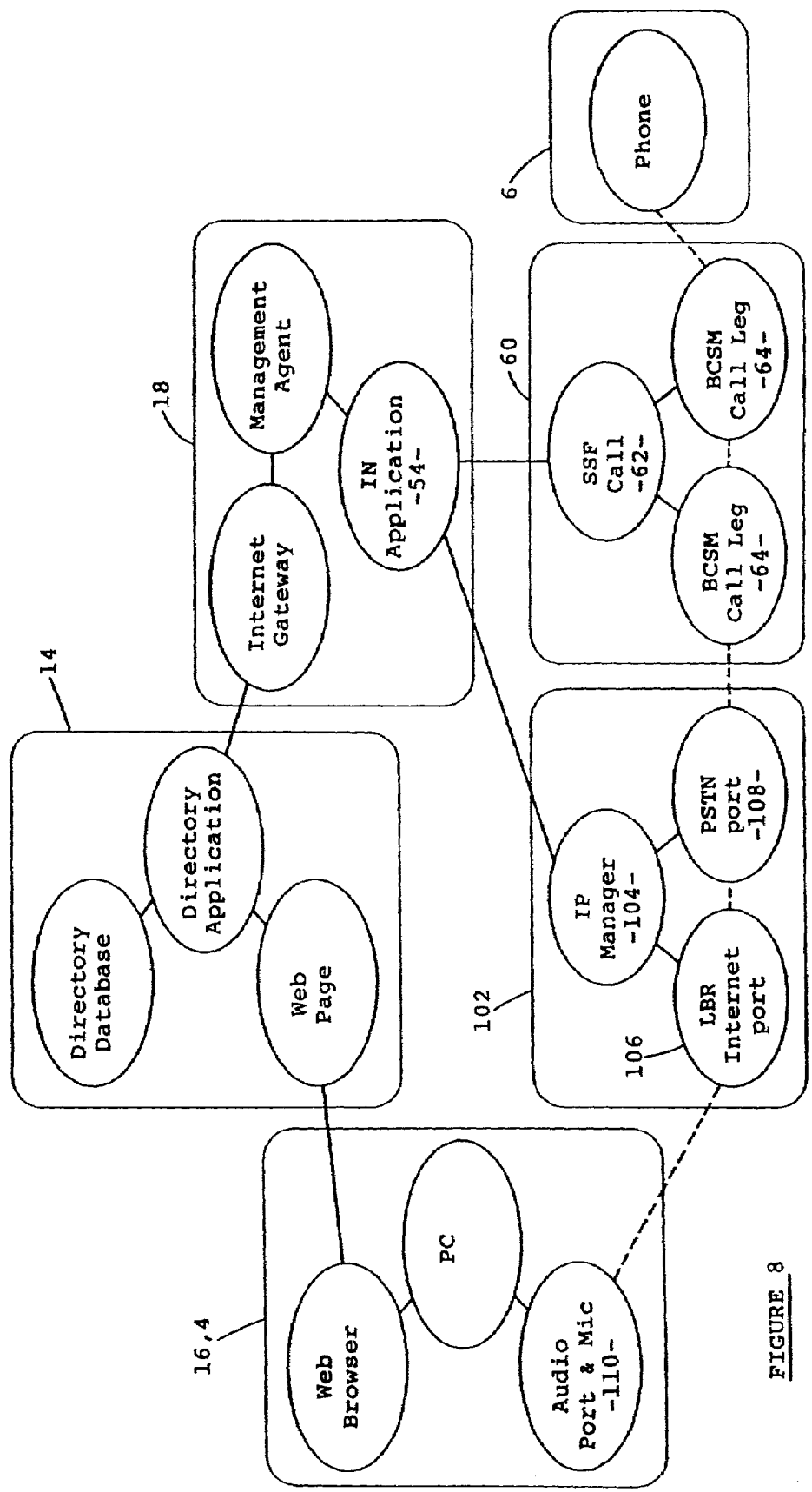
FIG. 8 is a block diagram of the system of FIG. 7.

An alternative system 10, as shown in FIGS. 7 and 8, is the same as the system 2 described previously except that the interactive device 16 is the terminal for the A party and an intelligent peripheral 102 is provided as part of the PSTN to provide a voice channel to the interactive device 16 on the same telecommunications line which is used to connect the device 16 to the directory service 14. The interactive device 16 executes an Internet phone application which allows the user to use an existing Internet access session on a telecommunications line from the device 16 to establish a phone connection on the same line. A suitable Internet phone application package is distributed by Netspeak Corporation of the U.S., or VocalTec Ltd. of Israel, for use in standard personal computers. The Internet phone application uses when necessary low-bit rate voice coding, for example of the order of 16 Kb/s, to establish the phone connection using the same Internet access line as that which would be used to access the directory service 14. The intelligent peripheral 102 receives and converts the low-bit rate voice signal to a standard 64 Kb/s for the PSTN 10.

The intelligent peripheral 102 is connected to the IN switch 60 and has an Internet protocol manager module 104 which receives the same call connect data as the SSF call procedure 62 from the IN application 54. The IP manager module 104 uses an LBR Internet port 106 for connection via the Internet 12 to an audio port and microphone 110 of the interactive device 16 and a PSTN port 108 for connection to a BCSM call leg module 64 of the IN switch 60. The IP manager 104 establishes a telecommunications path, which may be a voice/audio path, between the LBR Internet port 106 and the PSTN port 108. Call data passed between the ports 106 and 108 is converted between the low-bit rate Internet signal and the PSTN standard bit rate. The call between the A and B parties 4 and 6 is therefore connected from the audio port and microphone 110 of the A party through the ports 106 and 108, and the call leg module 64 to the terminal 6 of the B party.

The intelligent peripheral 102 may comprise a personal computer which includes an Internet phone package, such as I-Phone, and a digital to analogue converter. I-Phone is available from Netspeak Corporation of the U.S. or VocalTec Ltd. of Israel. I-Phone is designed to convert signals received from the microphone input of a personal computer to signals for an LBR Internet port. I-Phone also converts signals received on an LBR Internet port into signals for speaker outputs of a personal computer. Call establishment can be made by I-Phone over the Internet using standard TCP/IP protocols, and is made as a result of a call request passed to I-Phone from user input on the keyboard of the computer.

Figure 9:
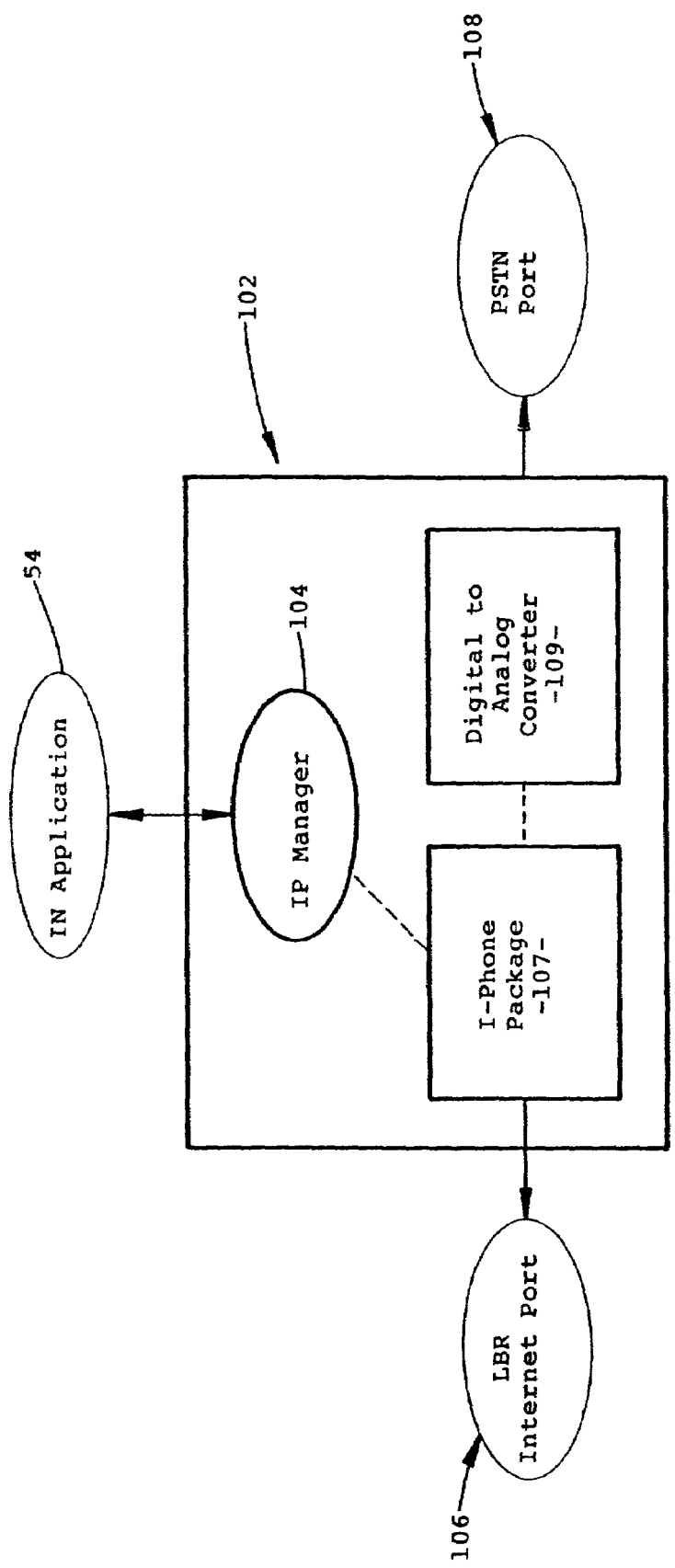
FIG. 9 is a block diagram of an intelligent peripheral of the system of FIG. 7.

In the intelligent peripheral 102, the I-Phone package 107 provides the LBR port 106 and the digital to analog converter 109 provides the PSTN port 108, as shown in FIG. 9. The digital to analog converter 109 accepts signals from I-Phone 107 which are usually fed to personal computer speakers, and converts them to digital signals as required by the BCSM call leg module 64 of the IN switch 60. The converter 109 also receives signals from the BCSM call leg module 64 and converts them to signals which I-Phone 107 would normally receive from a personal computer microphone.

The IP manger module 104 stored on the peripheral 102 issues call instructions to I-Phone 107, instead of a personal computer keyboard. The IP manager module 104 interfaces I-Phone 107 to the IN application 54 of the IN platform 6. Connection between the IP manager module 104 and the IN application 54 is made using standard TCP/IP sockets.

In response to a call setup request from the IN application 54, the IP manager 104 instructs I-Phone 107 to establish a call over the Internet to the audio port and microphone 110 of the customer's terminal 16. The IN application 54 connects the PSTN port 108 to the B party 6, and the connection is established between the B party 6 on a PSTN phone and the A party 4 on an Internet phone. The intelligent peripheral 102 is used when the request for call establishment from the directory service 14 to the IN platform 18 includes the Internet address of the A party instead of the A party's PSTN number. On recognising the different format in the address data, the IN platform 18 will invoke the intelligent peripheral 102.

The systems 2 and 100 and the call establishment procedures executed by them are particularly advantageous as they allow a client with an interactive device 16 to simply select a B party, without having to know that party's telecommunications number or address details, and establish a call between that party and a desired A party. The B party can be searched for using various search procedures provided by a directory service 14 using the interactive device 16, which can be remotely connected to the service 14. The system 100 also allows a call to be connected directly to the interactive device 16 using the same telecommunications line which may be used to remotely access directory information.

Many modifications will be apparent to those skilled in the art without departing from the scope of the present invention as hereinbefore described with reference to the accompanying drawings.

The invention claimed is:

1. A method of establishing a communications call, including:
    enabling an A party to select a B party from a database using an interactive device connected to a public network, said public network comprising an Internet messaging network,
    utilizing said Internet messaging network to send a message including identifying information of said B party to a public directory of said public network to access called address data for said B party from said public directory of said public network in response to selecting said B party,
    sending said called address data for said B party and calling address data for the A party to a connection module of a public telephone network of said public network; and
    establishing a call between said A party and said B party over said public network using said connection module and said called and calling address data.

2. The method as claimed in claim 1, wherein said interactive device is associated with said A party.

3. The method as claimed in claim 1, wherein said interactive device is a communications terminal for said call.

4. A method of establishing a communications call, including:
    enabling an A party to select a B party from a database using an interactive device connected to a public network; said public network comprising an Internet messaging network,
    employing said Internet messaging network to send a message including identifying information of said B party to a public directory of said public network to search for called address data for said B party in response to selecting said B party using said interactive device and a search module of said public network and a database of said public network including called address data;
    sending said called address data for said B party and calling address data for an A party to a connection module of a public telephone network of said public network; and
    establishing a call between said A party and said B party over said public network using said connection module and said called and calling address data.

5. The method as claimed in claim 1 or 4, wherein said interactive device is a computer and/or telephony device including a visual display.

6. A method of originating a communications call, including:
    enabling an A party to select a B party from a database using an interactive device connected to a public network, said public network comprising an Internet messaging network; and
    utilizing said Internet messaging network to send, in response to selection of said B party, a message including identifying information of said B party to a public directory of said public network to access called address data for said B party;
    wherein a connection module of a public telephone network of said public network receives calling address data for said A party and said called address data for said B party and establishes a call between said A party and said B party on the basis of said calling address data for the A party and said called address for the B party.

7. A method of originating a communications call, including:
    enabling an A party to select a B party from a database using an interactive device connected to a public network, said public network comprising an Internet messaging network;
    sending, in response to selection of said B party, a message including identifying information of said B party to a public directory of said public network;
    utilizing said Internet messaging network to obtain said called address data from a public directory of said public network in response to a search for said B party using said selected party data; and
    sending calling address data for said A party and said called address data for said B party to a connection module of a public telephone network of said public network for establishing a call between said A party and said B party.

8. The method as claimed in claim 6 or 7, wherein said public network further comprises at least one public telecommunications network for connecting said A and B parties.

9. The method as claimed in claim 8, wherein said messaging network provides said interactive device with a plurality of B party data.

10. The method as claimed in claim 8, wherein said messaging network accesses and forwards said called address data to said telecommunications network.

11. A system for use in establishing a communications call, including:
    a public directory accessible via an Internet messaging network including called address data for parties connected to at least one public network;
    an access module for transmitting via said Internet messaging network called address data of a B party selected by an A party accessed from said public directory for display on an interactive device to the A party in response to a request received from said interactive device, and for utilizing the messaging network to receive from said interactive device a request from the A party to establish a call with the selected B party; and
    a controller for receiving called address data for the selected B party, and calling address data corresponding to the A party and generating, in response thereto, network control signals to cause a public telephone network of said at least one public network to establish a call between said A party and said B party over said public network.

12. The system as claimed in claim 11, wherein at least one of the calling address data and the called address data includes account information.

13. A system for use in establishing a communications call, including:
- a public directory database of an Internet messaging network including called address data for parties connected to at least one public network;
- an access module for receiving on said at least one public network a message including identifying information of a B party selected by an A party utilizing a database and accessing called address data of said B party on the basis of said selected party data from the public directory database by utilizing said Internet messaging network; and
- a network controller for receiving said called address data of the B party and calling address data corresponding to the A party and generating, in response thereto, network control signals to cause a public telephone network of said at least one public network to establish a call between said A party and said B party over said public network.

14. The system as claimed in claim 11 or 13, wherein said network includes at least one public telecommunications network, such as a PSTN, for receiving said control signals and establishing said call, and wherein the messaging network comprises the Internet, for passing data between the A party, the access module and the network controller.

15. The system as claimed in claim 13, wherein the access module includes directory data from said directory database for display by said A party.

16. The system as claimed in claim 11 or 13, including a search module accessible by said A party over said network for searching said directory database.

17. The system as claimed in claim 11 or 13, wherein said call is established with a terminal of the A party which selects said selected B party.

18. The system as claimed in claim 11 or 13, wherein said call is established with a terminal of the A party which is separate from the terminal selecting said B party.

19. The system as claimed in claim 11 or 13, wherein the address data includes a party terminal number and security information.

20. A system for use in establishing a communications call on a public network, including:
- a call connection module for transmission of directory data to an interactive device of a user connected to the public network that comprises an Internet messaging network and for transmitting a connection message identifying an A party and a B party selected by the A party from said interactive device; said interactive device enabling the user to obtain party data for said A party and said B party from a public directory of said public network by utilizing said Internet messaging network,
- a call completion module for receiving said connection message and forwarding a connect message to a communication module of a public telephone network of said public network for establishing a call between said A party and said B party;
- wherein said connection message includes data from said public directory identifying at least said B party and said connect message includes communications address data for said A party and said B party.

21. The system as claimed in claim 20, including a directory database module for accessing directory data, including communications address data, of parties connected to at least said public network, wherein the communications address data of said connect message for at least said B party is obtained using said directory database module.

22. The system as claimed in claim 20, comprising a TCP/IP server connected to a TCP/IP network, such as the Internet, and wherein the public network is a telecommunications network, such as the PSTN.

23. A method of establishing a call between parties, including:
- utilizing an interactive device connected to a public network comprising an Internet messaging network to allow an A party to select a B party,
- generating a first message in response to selection by the A party of a displayed element on the interactive device, said first message including identification of the B party;
- generating a second message to a connection module of a public telephone network in response to said first message, said second message including a communication address of said B party determined on the basis of said identification data by accessing a public directory of said public network via said Internet messaging network and a communication address of said A party; and
- establishing a call between the A party and the B party using the connection module and said communication addresses of the A party and the B party.

24. The method as claimed in claim 23, wherein the identification data is name data.

25. The method as claimed in claim 23, wherein the directory service is adapted to access a database of public communications addresses stored against respective identification data.

26. The method as claimed in claim 23, wherein selection of the displayed element invokes generation of code on the interactive device to generate and send the first message.

27. The network system having components for executing the steps of a method as claimed in claim 1, 4, 6, 7, or 23.

28. A method of establishing a call, including:
- receiving a call request from a client device over an IP link that connects the client device to the Internet, said call request including data identifying parties for said call, wherein the parties are a calling party and a called party selected by the calling party;
- utilizing the Internet to access a public directory on a messaging network to obtain data identifying terminal of at least one of said parties in response to selecting said called party,
- generating a connection message to a connection module of a public telephone network, in response to said call request, including data identifying terminals for said parties; and
- utilizing the connection module to establish said call between said terminals over a public network in response to said connection message.

29. The method as claimed in claim 28, wherein said terminals include two telephones.

30. The method as claimed in claim 28, wherein said terminals include a telephone and said client device having a voice over IP application.

31. The method as claimed in claim 28, wherein said terminals include said client device and a further client device both having a voice over IP application.

32. The method as claimed in claim 28, wherein said call is established over a public network, such as the PSTN.

33. The method as claimed in claim 28, wherein said receiving and generating steps are executed by a server, such as a web server.

34. The method as claimed in claim 28, wherein said connection message is sent to network equipment that executes said establishing step.

35. The method as claimed in claim 28, wherein said call request is a HTTP request.

36. The method as claimed in claim 28, wherein said client device is a computer device, such as a computer, handheld device or telephony device with a visual display.

37. A method of establishing a communications call, comprising enabling an A party to select a B party from a database using an interactive device connected to a public network, said public network comprising an Internet messaging network, utilizing said Internet messaging network to send a message including identifying information of said B party to a public directory of said public network to access called address data for said B party from a public directory of said public network in response to selecting said B party, sending said called address data for said B party and calling address data for the A party to a connection module of said public network, said connection module providing a voice channel via said messaging network, and establishing a call between said A party and said B party over said public network using said voice channel and said called and calling address data.

38. The method of claim 37, wherein said interactive device executes an Internet phone application to establish said call.

39. A method of establishing a call, including:

receiving a call request from a client device over an IP link that connects the client device to the Internet, said call request including data identifying parties for said call, wherein the parties are a calling party and a called party selected by the calling party;

utilizing the Internet to access a public directory on a messaging network to obtain data identifying terminal of at least one of said parties in response to selecting said called party, generating a connection message to connection module of a public telephone network, in response to said call request, including data identifying terminals for said parties; and utilizing said connection module to establish a call between said terminals over a public network in response to said connection message.

* * * * *